Figure 5:
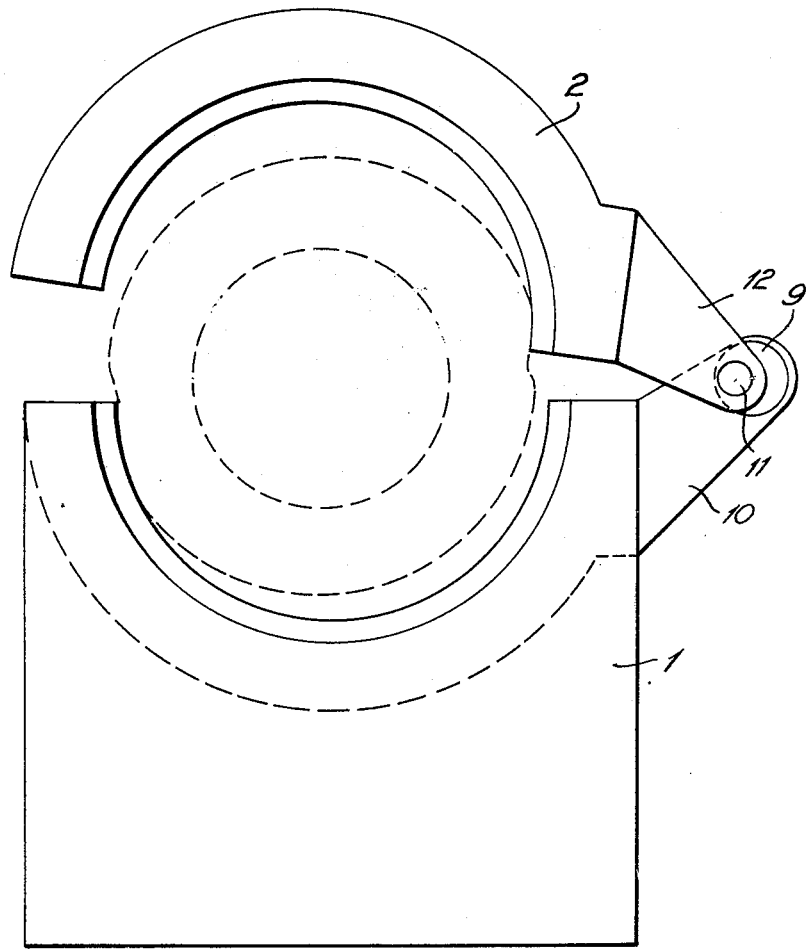

June 10, 1952  J. H. F. KENT  2,599,841
MOLD FOR TIRES
Filed Dec. 23, 1946  4 Sheets-Sheet 1
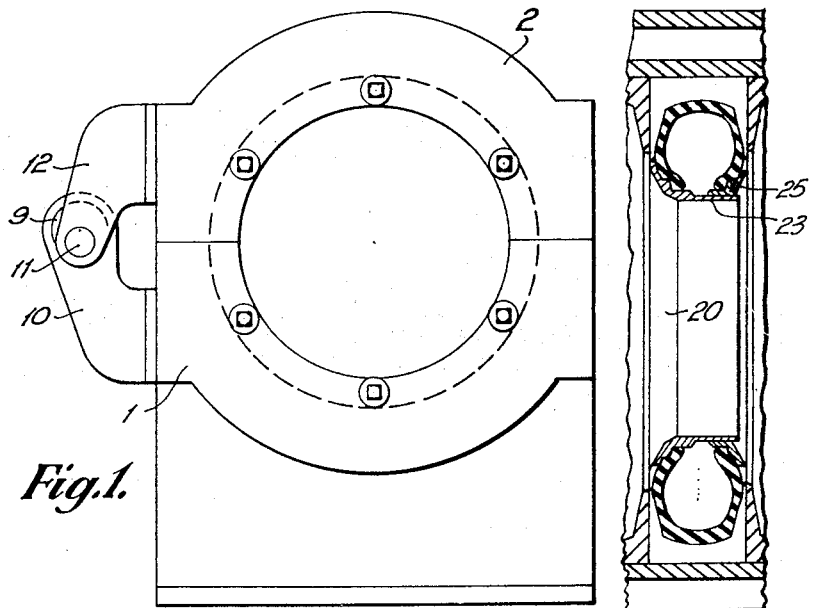
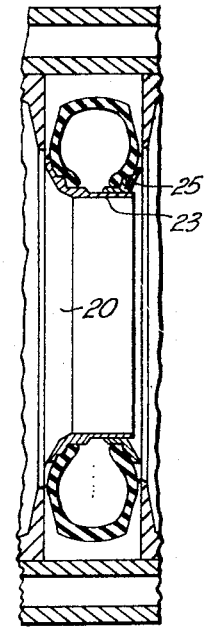
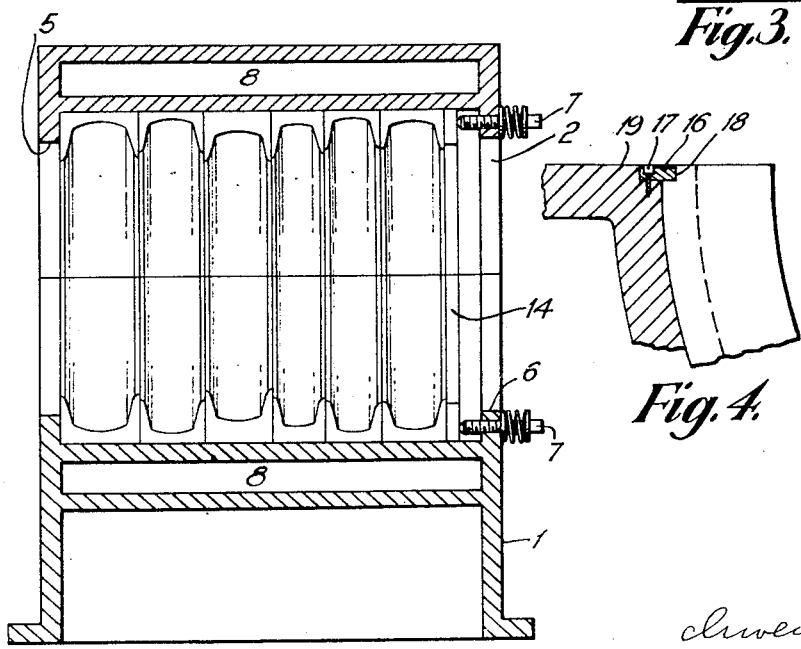
Inventor:
Jan H. F. Kent
By his attorneys:
Baldwin & Wight June 10, 1952  J. H. F. KENT  2,599,841
MOLD FOR TIRES Filed Dec. 23, 1946  4 Sheets-Sheet 2

Inventor:
Jas. H. F. Kent,
By his attorneys:
Baldwin & Wight

June 10, 1952 J. H. F. KENT 2,599,841
MOLD FOR TIRES
Filed Dec. 23, 1946 4 Sheets-Sheet 3
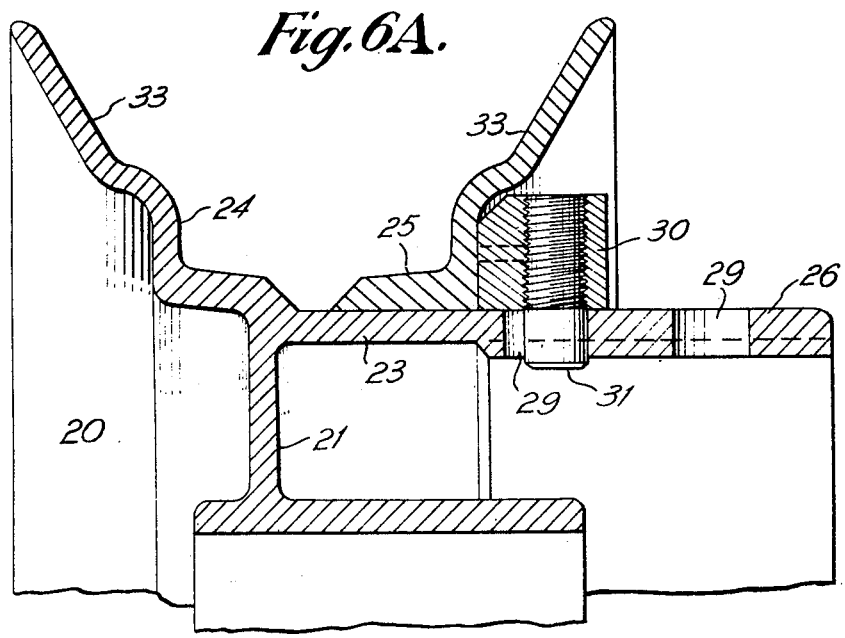
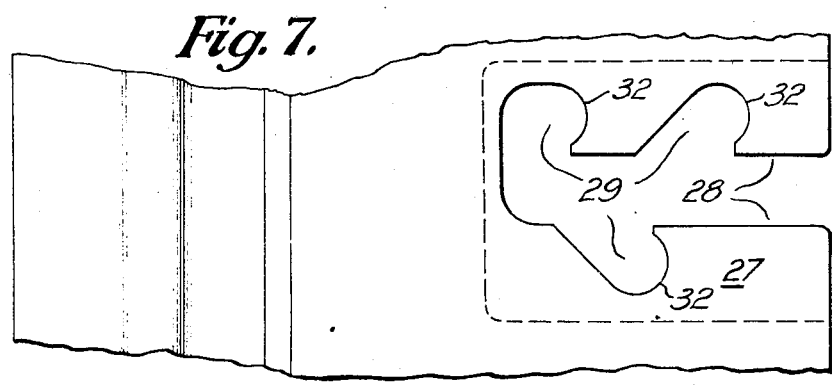
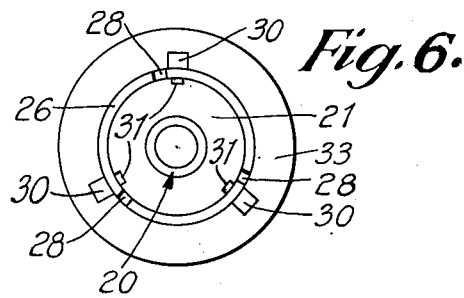

June 10, 1952   J. H. F. KENT   2,599,841
MOLD FOR TIRES

Filed Dec. 23, 1946   4 Sheets-Sheet 4

Inventor
Jan H. F. Kent
By his attorneys
Baldwin, Wight, & Prevost

Patented June 10, 1952

2,599,841

UNITED STATES PATENT OFFICE 2,599,841

MOLD FOR TIRES

Jan Herbert Farquharson Kent, Basingstoke, England, assignor of one-half to Auto Tyre Services Limited, Basingstoke, England, a company of Great Britain Application December 23, 1946, Serial No. 717,829
In Great Britain October 9, 1945

1 Claim. (Cl. 18—18)

This invention relates generally to moulding apparatus for vulcanizing tires and especially to means for supporting the tires to be vulcanized during the curing operation.

More specifically, the invention resides in a particular construction of rim for supporting the tire against danger of undue distortion, and which rim includes a flange having a novel lug and slot connection to enable adjustment and detachment.

In an embodiment of the invention, the apparatus comprises a two part chest with the lower or base portion forming a stand for the second and upper portion, and being hingedly connected thereto. The chest may thus consist of two hollow walled half cylinders, within which walls steam is caused to circulate by the necessary steam connections. The tire matrices are a close fit within the interior chamber of the chest so as to ensure a good heat conducting path and they may be held in position by an end clamp or clamps engaging a locating ring which itself bears on the outermost matrix. In place of or in addition to the clamp, locating strips may be provided, these strips engaging shoulders formed in the meeting faces of the respective matrices and themselves being located in recesses formed in the surface of the heating chamber.

One difficulty experienced in the curing of tires which applies both to the manufacture of a new tire and to a "retread" is that of removing the tire after vulcanisation from the matrix, which is enhanced by the intricate nature of the pattern on the tread of the tire causing the tire surface to adhere to the mould.

We overcome this difficulty, according to the invention by causing the two or more parts of the matrix or of the mould within which the matrix, or matrices, is, or are, held to receive, prior to being separated, a relative displacement so that the centres of the matrix are offset in the plane of their meeting faces. Thus, when the matrix is opened up to remove the tire therewithin, the latter will be subjected to a peeling or stripping action commencing at two opposite points on the circumference of the tire.

The invention is illustrated in the accompanying drawings in which Fig. 1 is an end view of a moulding apparatus (with matrices removed) constructed in accordance with the invention, Fig. 2 being a longitudinal section thereof but showing the matrices in position.

Fig. 3 is a part-sectional view on an enlarged scale showing a matrix with its associated tire supporting frame.

Fig. 4 is a section of a detail. Fig. 5 is an end view illustrating the action of the mould when being opened and ejecting the tire. Fig. 6 is a side elevational view showing the frame or mock rim for supporting the tire or other article to be vulcanised during the curing operation. Fig. 6A is a sectional view on a large scale showing said frame or mock rim. Fig. 7 is a part plan view on the same scale illustrating the means of securing the detachable flange thereto.

Figure 8:
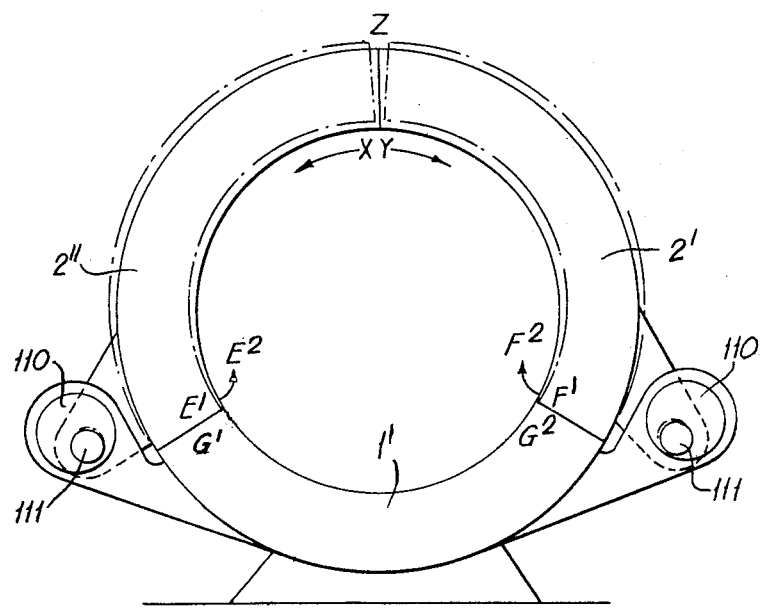

Fig. 8 is a view similar to Fig. 5 but showing the invention as embodied in an apparatus including more than two, specifically three sections.

Referring to the accompanying drawings the vulcanizing apparatus consists of a two part mould supporting chest providing a heating chamber including a base portion 1 which constitutes the lower and stationary section of the mould chamber, the other and upper portion 2 operating as a closing section, which in the closed position clamps down on to its base and complementary section 1. The space enclosed between the two sections of the mould chamber is cylindrical and houses the moulds proper termed the matrices for retreading old tires.

The cylindrical housing includes end flanges 5 and 6 of sufficient depth to receive and locate the matrices endwise, of which there may conveniently be six as shown in Figure 2. At one end of the chamber, the flanges are provided with set screws 7 for holding the matrices, when in position, firmly clamped to one another as hereinafter described. The circumferential walls of the housing are hollow as indicated at 8 so as to provide passages for the flow of the heating medium, usually steam, the passages being provided with steam connections, not shown.

When closed as in the position shown in Figure 3 the cover section 2 is in correct registration with the lower stationary half of the mould chest.

The meeting faces or the plane about which the mould cover 2 separates from its lower half 1 is a horizontal plane passing through the centre of the mould chest or, as applied to the half matrices contained within the mould chest, a diametral plane of the tire.

The two sections of the heating chamber as also the matrices are hinged to one another by means of an eccentrically operating hinge as indicated in Figure 1. The hinge proper, indicated as a pin or shaft at 9, is journalled to rotate in bearings formed in arms 10 on the lower section of the heating chamber. The studs 11, constituting the secondary or hinge parts about which the mould cover 2 is mounted to swing, when opened, by the arms 12, are themselves integral with the hinge proper 9.

It will be seen therefore that by reason of the eccentricity of the hinge studs 11 in relation to the hinge proper 9, any rotation of the part 9 will produce a relative movement between the mould sections with the result that the cover 2 will be displaced laterally. By suitable selection of the eccentricity and the angle through which part 9 is turned, it is possible to move one half of the tire cover contained in the section 2 in relation to the other half which will give rise to a peeling action at the tread, producing a gradual separation of the tire from its matrix as the cover is raised about its hinge 11.

The set screws 7, by which the matrices are held in position are spring-loaded and are adjustable. The ends of the screws bear on a pressure plate 14. To prevent the matrices from shifting circumferentially in the respective parts of heating chamber, the latter may be provided with keys 16 (see Fig. 4) each key being detachably secured by a set screw 17 in a recess 18 cut in the separating faces 19 (see Fig. 4) of the lower half of the mould. These keys engage a corresponding recess in the meeting faces of the matrix and it will be understood that a similar set of keys and recesses is provided in the upper or closing half of the chest.

Referring now to Figs. 6, 6A and 7 the matrix according to the invention comprises an annular support or frame indicated generally at 20, which co-operates with the matrix proper to support the tire undergoing vulcanisation with the object of eliminating undue distortion of the walls of the tire due to the pressure applied to the interior wall of the tire which is considerable during the curing operation. In the embodiment illustrated in Fig. 6 the frame is of inverted T-section, the stem 21 thereof terminating in a circumferential flat 23, with which is integral a fixed flange 24. The flat 23 provides a seating for a detachable flange 25 and is extended laterally as at 26 to permit of adjustment of the detachable flange to accommodate various sizes of tires and the different widths of tire sections. Extending round the periphery 27 are a series of lateral slots 28 each having recesses 29, of which there are three shown in Fig. 7, two being along one edge of the slot and the third in the opposite side and located intermediate the other two recesses.

The detachable flange is held in position by lugs 30 having a stud 31 of a size to fit the recesses, the inner ends of which are rounded as at 32 to receive the stud.

Both detachable and fixed flanges have side cheeks 33 to support the tire wall against distortion.

It has been found that the use of this support or frame in conjunction with the matrix proper makes it possible to reduce the high pressure in the inflation tube which is inserted in the tire prior to placing it within the matrix.

In operation in order to free the tire from the matrix on completion of the vulcanization operation, it is sufficient to effect a partial rotation of the hinge pin or stud 9 about its eccentric axis which will automatically cause the mould cover 2 and with it the matrix to shift relatively to their opposite (bottom) sections along their meeting faces. This will cause the tire to peel away from the inner face of the matrix at two opposite points on its circumference, and therefore as the matrix is opened the tire will automatically strip away from the retaining surfaces of the mould. Such an arrangement will be found to effect a considerable saving in labour and, furthermore, the quality of the retread or tire is improved since there is less damage to the tread pattern as the tire is stripped from the mould.

It will be understood that when the mould cover starts to lift, carrying with it the upper halves of the matrices, the tires are left sitting in the lower halves of the matrices, but stripped from them. This factor is of major importance, for if the tires remained unstripped from the lower halves of the matrices, it would be almost impossible to remove them without damage to the treads.

While the invention has been described mainly in connection with a two part mould and matrix, it is equally applicable to a construction where the mould or matrix is in more than two portions. In fact, for larger sizes of tires a three part mould and a similar three part matrix may be preferable, the several portions where the matrix is of cylindrical section being separable along a radial line. Such an arrangement is shown in Figure 8 of the drawings, in which the mould chest is divided into three sections, a fixed section 1' and cover sections 2', 2''. The fixed section 1' is provided with eccentric shafts 110 carrying hinge pins 111. To remove the tire from the mould, both eccentrics are worked so as to rotate inwards so as to peel the tire out of the bottom section 1', after which the opening cover sections 2', 2'' are swung outwards to release them from the tire. The method of operation is to rotate both eccentrics simultaneously causing the lower portions of sections 2', 2'' to move E1 to E2 and F1 to F2. This has the effect of lifting the tread of the tire clear of the fixed section 1' at the two points G1 and G2. In fact, if the eccentrics were rotated sufficiently far, the tire would be completely extracted from 1'. At the same time the sections 2', 2'' slightly separate at Z. Sections 2' and 2'' are then forced apart either hydraulically or mechanically, thus stripping them off the tire progressively from points X and Y around to E1 and F1. The mould would then be open and the tire completely freed from it.

What I claim is:

Apparatus for use in the application of tread to tires, comprising a mould; a rim device for supporting a tire and having a fixed flange and a mounting part which is flat in a direction parallel to the mould axis and arcuate circumferentially about said axis; an adjustable flange slidably carried by said mounting part so as to be capable of lateral adjustment thereon; and fixing means for securing the adjustable flange to said mounting part including a plurality of lateral slots in said mounting part extending substantially parallel to the mould axis and being formed with recesses in their sides at different distances from said fixed flange in a direction parallel to the mould axis, and a plurality of lugs respectively having studs removably positionable in selected recesses of said slots for maintaining said lugs and said adjustable flange in adjusted position with respect to said fixed flange.

JAN HERBERT FARQUHARSON KENT.

REFERENCES CITED

The following references are of record in the file of this patent:

UNITED STATES PATENTS

| Number | Name | Date |
|---|---|---|
| 506,417 | Colony | Oct. 10, 1893 |
| 1,836,850 | Hudson | Dec. 15, 1931 |
| 2,004,800 | Rogers | June 11, 1935 |
| 2,088,130 | Broering et al. | July 27, 1937 |
| 2,115,349 | Taylor | Apr. 26, 1938 |
| 2,124,345 | Grange | July 19, 1938 |
| 2,152,765 | Kite et al. | Apr. 4, 1939 |
| 2,308,977 | Iverson et al. | Jan. 19, 1943 |
| 2,340,231 | Soderquist | Jan. 25, 1944 |
| 2,345,172 | Bacon | Mar. 28, 1944 |
| 2,440,087 | Green | Apr. 29, 1948 |
| 2,474,542 | McCloud et al. | June 28, 1949 |